(12) United States Patent
Varadarajan et al.

(10) Patent No.: US 12,420,846 B2
(45) Date of Patent: Sep. 23, 2025

(54) AGENT TRAJECTORY PREDICTION USING CONTEXT-SENSITIVE FUSION

(71) Applicant: Waymo LLC, Mountain View, CA (US)

(72) Inventors: Balakrishnan Varadarajan, Sunnyvale, CA (US); Ahmed Said Mohammed Hefny, Santa Clara, CA (US); Benjamin Sapp, Marina del Rey, CA (US); Khaled Refaat, Mountain View, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 826 days.

(21) Appl. No.: 17/700,348

(22) Filed: Mar. 21, 2022

(65) Prior Publication Data

US 2022/0297728 A1 Sep. 22, 2022

Related U.S. Application Data

(60) Provisional application No. 63/163,274, filed on Mar. 19, 2021.

(51) Int. Cl.
*B60W 60/00* (2020.01)
*B60W 50/00* (2006.01)
*G05B 17/02* (2006.01)

(52) U.S. Cl.
CPC .. *B60W 60/00276* (2020.02); *B60W 50/0097* (2013.01); *G05B 17/02* (2013.01); *B60W 2556/10* (2020.02); *B60W 2556/35* (2020.02)

(58) Field of Classification Search
None
See application file for complete search history.

(56) References Cited

U.S. PATENT DOCUMENTS

| | | | |
|---|---|---|---|
| 10,254,759 B1 | 4/2019 | Faust et al. | |
| 2018/0124423 A1* | 5/2018 | Choi | G06V 10/82 |
| 2021/0001884 A1 | 1/2021 | Alvarez et al. | |
| 2021/0101614 A1* | 4/2021 | White | G01C 21/3641 |
| 2021/0380119 A1* | 12/2021 | Korjus | G01S 15/86 |

FOREIGN PATENT DOCUMENTS

| | | |
|---|---|---|
| CN | 110794823 A | 2/2020 |
| CN | 110826698 A | 2/2020 |
| WO | WO 2020/243162 A1 | 12/2020 |

OTHER PUBLICATIONS

Office Action in European Appln. No. 22163372.0, dated Jul. 5, 2024, 8 pages.
Alahi et al., "Social LSTM: Human Trajectory Prediction in Crowded Spaces," Proceedings of the IEEE Conference on Computer Vision and Pattern Recognition, Jun. 27-30, 2016, pp. 961-971.

(Continued)

*Primary Examiner* — Hitesh Patel
*Assistant Examiner* — Wenyuan Yang
(74) *Attorney, Agent, or Firm* — Fish & Richardson P.C.

(57) ABSTRACT

Methods, systems, and apparatus, including computer programs encoded on computer storage media, for agent trajectory prediction using context-sensitive fusion.

22 Claims, 5 Drawing Sheets

(56) References Cited

OTHER PUBLICATIONS

Biktairov et al., "Prank: motion prediction based on ranking," Advances in Neural Information Processing Systems 33, Oct. 22, 2020, 11 pages.
Bishop, "Pattern recognition and machine learning," Springer, Aug. 17, 2006, 12 pages.
Buhet et al., "Plop: Probabilistic polynomial objects trajectory planning for autonomous driving," CoRR, Mar. 9, 2020, arxiv.org/abs/2003.08744, 20 pages.
Caesar et al., "nuScenes: A multimodal dataset for autonomous driving," Proceedings of the IEEE/CVF Conference on Computer Vision and Pattern Recognition, Mar. 26, 2020, pp. 11621-11631.
Casas et al., "Intentnet: Learning to predict intention from raw sensor data," Proceedings of The 2nd Conference on Robot Learning, Oct. 23, 2018, 87:947-956.
Casas et al., "Spagnn: Spatially-aware graph neural networks for relational behavior forecasting from sensor data," 2020 IEEE International Conference on Robotics and Automation (ICRA), May 31, 2020, 11 pages.
Chai et al., "Multipath: Multiple probabilistic anchor trajectory hypotheses for behavior prediction," CoRR, Oct. 12, 2019, https://arxiv.org/abs/1910.05449, 14 pages.
Chang et al., "Argoverse: 3D tracking and forecasting with rich maps," Proceedings of the IEEE/CVF Conference on Computer Vision and Pattern Recognition, Jan. 1, 2019, pp. 8748-8757.
Cui et al., "Deep kinematic models for kinematically feasible vehicle trajectory predictions," 2020 IEEE International Conference on Robotics and Automation (ICRA), May 31, 2020, pp. 10563-10569.
Cui et al., "Multimodal trajectory predictions for autonomous driving using deep convolutional networks," IEEE Intl. Conf. on Robotics and Automation, May 20, 2019, 7 pages.
Douglas et al., "Algorithms for the reduction of the number of points required to represent a digitized line or its caricature," Cartographica: the International Journal for Geographic information and geovisualization, Dec. 1973, 10(2):112-122.
Extended European Search Report in European Appln. No. 2216332.0, dated Aug. 1, 2022, 9 pages.
Friedman et al., "The elements of statistical learning," Data Mining, Inference, and Prediction, Springer series in statistics New York, 2001, 1:11 pages.
Gao et al., "VectorNet: Encoding hd maps and agent dynamics from vectorized representation," Proceedings of the IEEE/CVF Conference on Computer Vision and Pattern Recognition (CVPR), Jun. 1, 2020, 11525-11533.
Gupta et al., "Social GAN: Socially acceptable trajectories with generative adversarial networks," Proceedings of the IEEE Conference on Computer Vision and Pattern Recognition (CVPR), Mar. 29, 2018, pp. 2255-2264.
He et al., "Deep residual learning for image recognition," Proceedings of the IEEE Conference on Computer Vision and Pattern Recognition, Dec. 10, 2015, pp. 770-778.
Hong et al., "Rules of the road: Predicting driving behavior with a convolutional model of semantic interactions," Proceedings of the IEEE/CVF Conference on Computer Vision and Pattern Recognition, Jun. 1, 2019, pp. 8454-8462.
Hosang et al., "Learning non-maximum suppression," Proceedings of the IEEE conference on computer vision and pattern recognition, May 8, 2017, pp. 4507-4515.
Khandelwal et al., "What-if motion prediction for autonomous driving," CoRR, Aug. 24, 2020, arxiv.org/abs/2008.10587, 16 pages.
Lee et al., "Desire: Distant future prediction in dynamic scenes with interacting agents," Proceedings of the IEEE Conference on Computer Vision and Pattern Recognition (CVPR), Jul. 1, 2017, pp. 336-345.
Liang et al., "Learning lane graph representations for motion forecasting," CoRR, Aug. 23, 2020, arxiv.org/abs/2007.13732, 18 pages.
Marchetti et al., "Mantra: Memory augmented networks for multiple trajectory prediction," Proceedings of the IEEE/CVF Conference on Computer Vision and Pattern Recognition, Jun. 13, 2020, pp. 7143-7152.
Mercat et al., "Multi-head attention for joint multi-modal vehicle motion forecasting," IEEE Intl. Conf. on Robotics and Automation, May 23, 2020, 7 pages.
Miech et al., "Learnable pooling with context gating for video classification," CoRR, Jun. 21, 2017, arXiv:1706.06905, 8 pages.
Park et al., "Diverse and admissible trajectory forecasting through multimodal context understanding," ECCV 2020: Computer Vision—ECCV 2020, Nov. 27, 2020, pp. 282-298.
Phan-Minh et al., "CoverNet: Multimodal behavior prediction using trajectory sets," Proceedings of the IEEE/CVF Conference on Computer Vision and Pattern Recognition (CVPR), Jun. 1, 2020, pp. 14074-14083.
Qi et al., "Pointnet: Deep learning on point sets for 3d classification and segmentation," Proceedings of the IEEE Conference on Computer Vision and Pattern Recognition (CVPR), Dec. 2, 2016, pp. 652-660.
Ren et al., "Faster r-cnn: Towards real-time object detection with region proposal networks," Advances in Neural Information Processing Systems 28, Jun. 6, 2016 pp. 91-99.
Rhinehart et al., "Precog: Prediction conditioned on goals in visual multi-agent settings," Proceedings of the IEEE/CVF International Conference on Computer Vision, Oct. 1, 2019, pp. 2821-2830.
Rhinehart et al., "R2P2: A reparameterized pushforward policy for diverse, precise generative path forecasting," Proceedings of the European Conference on Computer Vision (ECCV), Sep. 8, 2018, pp. 772-788.
Russakovsky et al., "Imagenet large scale visual recognition challenge," International journal of computer vision, Apr. 11, 2015, 115(3):211-252.
Salzmann et al., "Trajectron++: Multi-agent generative trajectory forecasting with heterogeneous data for control," European Conference on Computer Vision, Jan. 13, 2021, pp. 683-700.
Tang et al., "Multiple futures prediction," Advances in Neural Information Processing Systems 32, Dec. 6, 2019, 11 pages.
Yuan et al., "Diverse trajectory forecasting with determinantal point processes," CoRR, Jul. 11, 2019, arxiv.org/abs/1907.04967, 15 pages.
Zeng et al., "End-to-end interpretable neural motion planner," Proceedings of the IEEE/CVF Conference on Computer Vision and Pattern Recognition (CVPR), Jun. 15-20, 2019, 10 pages.
Zhan et al., "Interaction Dataset: An INTERnational, Adversarial and Cooperative moTION Dataset in Interactive Driving Scenarios with Semantic Maps," CoRR, Sep. 30, 2019, arXiv:1910.03088, 13 pages.
Zhao et al., "Tnt: Target-driven trajectory prediction," CoRR, Oct. 4, 2020, arXiv:2008.08294, 12 pages.
Office Action in Chinese Appln. No. 202210280603.6, mailed on Mar. 31, 2025, 18 pages (with English translation).

* cited by examiner

AGENT TRAJECTORY PREDICTION USING CONTEXT-SENSITIVE FUSION

CROSS-REFERENCE TO RELATED APPLICATION

This application claims priority to U.S. Provisional Application No. 63/163,274, filed on Mar. 19, 2021. The disclosure of the prior application is considered part of and is incorporated by reference in the disclosure of this application.

BACKGROUND

This specification relates to predicting the future trajectory of an agent in an environment.

The environment may be a real-world environment, and the agent may be, e.g., a vehicle, cyclist, pedestrian, or other vehicle in the environment. Predicting the future trajectories of agents is a task required for motion planning, e.g., by an autonomous vehicle.

Autonomous vehicles include self-driving cars, boats, and aircraft. Autonomous vehicles use a variety of on-board sensors and computer systems to detect nearby objects and use such detections to make control and navigation decisions.

SUMMARY

This specification generally describes a system implemented as computer programs on one or more computers in one or more locations that predicts the future trajectory of an agent in an environment.

The subject matter described in this specification can be implemented in particular embodiments so as to realize one or more of the following advantages.

Predicting the future behavior of road users is a challenging and important problem for autonomous driving and control of other types of autonomous vehicles. Applying deep learning to this problem requires fusing heterogeneous world state in the form of rich perception signals and map information, and inferring highly multimodal distributions over possible futures. This specification describes a trajectory prediction system that generates more accurate trajectory predictions than conventional systems. In particular, the described system encodes the input world state, i.e., data characterizing the current state of the environment obtained from perception signals generated from sensor measurements and from map information generated from map data identifying road features in the environment, using a sparse encoding of heterogeneous scene elements, e.g., describing road features using compact and efficient polylines and representing raw agent state information directly (e.g., position, velocity, acceleration). Representing the state data in this manner, e.g., as opposed to an image-based encoding or other encoding types that try to represent all input signals in a single input representation, allows the system to better capture interactions between different elements within the highly heterogeneous mix of static and dynamic inputs that are provided to the system. This results in improved trajectory prediction performance, i.e., because the system can more effectively capture possible interactions among the inputs that may affect the future trajectories of agents in the scene.

Moreover, the described systems perform a context-aware fusion of these input elements, e.g., using a multi-context gating fusion component, that allows the system to effectively incorporate features of these input elements when making a trajectory prediction, further improving the ability of the system to capture important interactions and make more accurate trajectory predictions.

In some implementations, the system uses learned latent anchor embeddings to represent learned anchor trajectories that are learned end-to-end with the remainder of the model. Using these learned trajectories to form the anchors of the Gaussian mixture model that is represented by the output of the system allows the system to generate trajectory predictions that more effectively capture the multi-modal nature of possible agent behavior while still avoiding "mode collapse" as experienced by some conventional systems. A conventional system that experiences mode collapse may generate multiple predicted future trajectories of the agent that differ very little from a single deterministic estimate of the future trajectory of the agent.

In some implementations, the system uses an ensemble of multiple prediction heads that each generate a respective trajectory prediction from the same fused embedding. The system then combines these trajectory predictions to generate a more accurate final trajectory prediction that better captures the possible multi-modal nature of the future behavior of the target agent, e.g., that more accurately characterizes multiple different plausible trajectories that the agent could take in the future.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model, referred to in this specification as a "trajectory prediction system," to generate a respective trajectory prediction output for each of one or more surrounding agents in the vicinity of the vehicle in an environment.

In this specification, a "surrounding agent" can refer, without loss of generality, to a vehicle, bicycle, pedestrian, ship, drone, or any other moving object in an environment.

This specification also describes how training examples generated by vehicles or other sources can be used to effectively train the trajectory prediction system to accurately and reliably make predictions.

Figure 1:
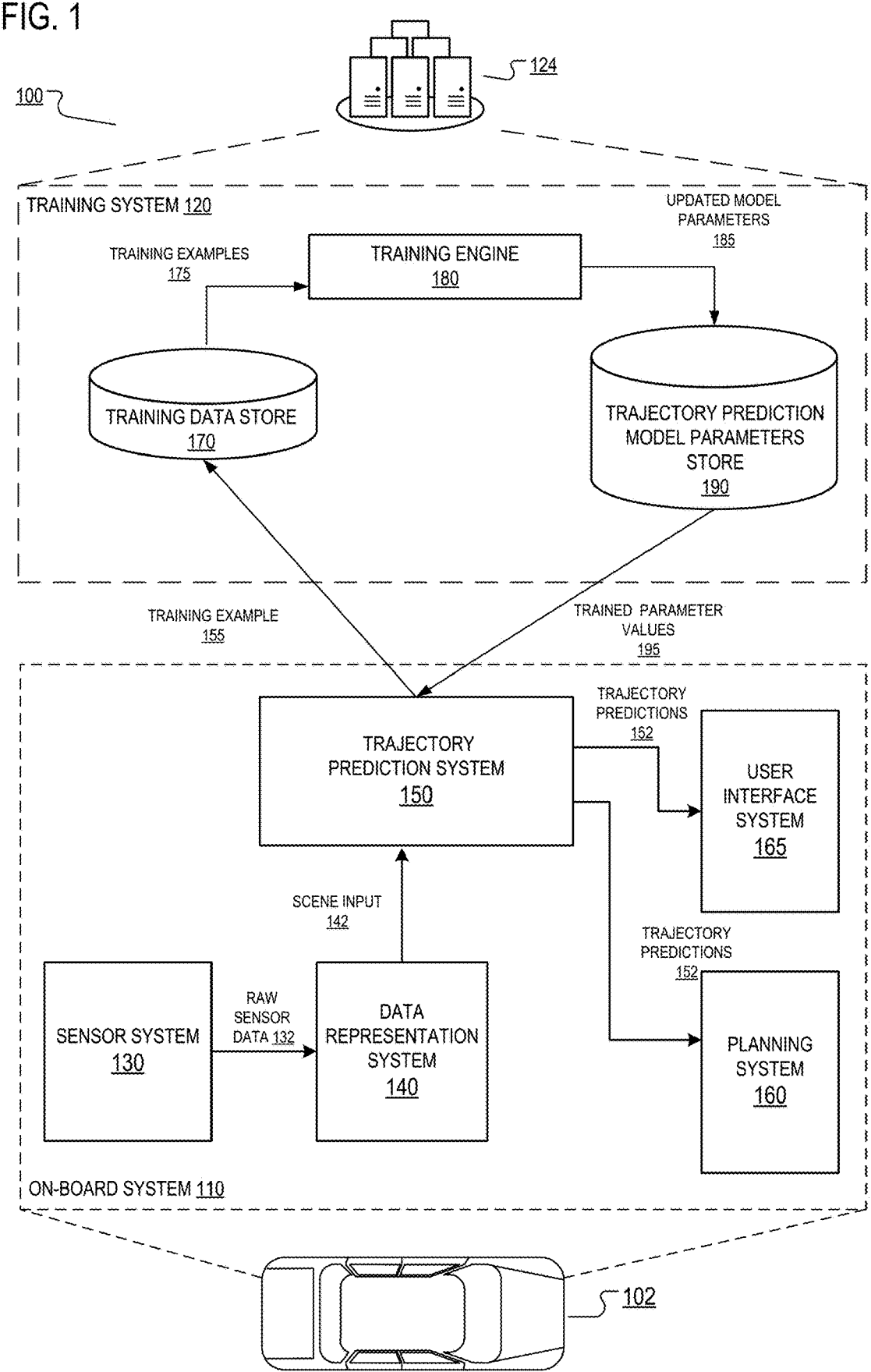
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 120 can alert the driver of the vehicle 102 or take an autonomous driving action when an obstacle is detected, when the vehicle departs from a driving lane, or when an object is detected in a blind spot of the human driver.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and generates scene data 142. The scene data 142 characterizes the current state of the environment surrounding the vehicle 102 as of the current time point and will also be referred to below as "context data."

For example, the scene data can characterize, for all surrounding agents in the environment, a current state at the current time point and a previous state at one or more respective previous time points. In other words, the scene data can include, for all surrounding agents in the environment, data that characterizes a previous trajectory of the agent in the environment up to the current time point. The state of an agent at a time point can include the location of the agent at the time point and, optionally, values for a predetermined set of motion parameters at the time point. As a particular example, the motion parameters can include a heading for the agent, a velocity of the agent, and/or an acceleration of the agent.

The scene data also includes data characterizing a current state of the vehicle at the current time point and a previous state of the vehicle at one or more respective previous time points. In some implementations, the scene data also includes data characterizing features of the environment that are obtained from map information characterizing the environment. These features can include (i) dynamic features of the environment, e.g., traffic light states at the current time point, (ii) static features of the environment, e.g., road graph data characterizing one or more of lane connectivity, lane type, stop lines, speed limits, and so on, or (iii) both.

Examples of how the scene data 142 represents the state of the environment are described below with reference to FIG. 2.

The data representation system 140 provides the scene data 142 to a trajectory prediction system 150, also on-board the vehicle 102.

The trajectory prediction system 150 processes the scene data 142 to generate a respective trajectory prediction output 152 for each of one or more of the surrounding agents. The trajectory prediction output 152 for a given agent characterizes the future trajectory of the agent after the current time point.

More specifically, the trajectory prediction output 152 for a given agent represents a probability distribution over possible future trajectories that can be followed by the agent.

Generally, the trajectory prediction output 152 includes data characterizing a predicted similarity of the future trajectory of the agent to each of a plurality of anchor trajectories. Each anchor trajectory characterizes a different possible future trajectory of the agent after the current time point and includes data specifying a sequence of multiple waypoint spatial locations in the environment that each correspond to a possible position of the agent at a respective future time point that is after the future time point. In other words, each anchor trajectory identifies a different sequence of waypoint locations in the environment that may be traversed by the surrounding agent after the current time point.

In some implementations, these anchor trajectories are pre-determined. In other implementations, as will be described in more detail below, the anchor trajectories are latent trajectories that are learned during the training of the system 150.

Generating the trajectory prediction outputs will be described in more detail below with reference to FIGS. 2 and 3.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the trajectory prediction outputs 152 generated by the trajectory prediction system 150 to one or more other on-board systems of the vehicle 102, e.g., the planning system 160 and/or a user interface system 165.

When the planning system 160 receives the trajectory prediction outputs 152, the planning system 160 can use the trajectory prediction outputs 152 to generate planning decisions that plan a future trajectory of the vehicle, i.e., to generate a new planned vehicle path. For example, the trajectory prediction outputs 152 may contain a prediction that a particular surrounding agent is likely to cut in front of the vehicle 102 at a particular future time point, potentially causing a collision. In this example, the planning system 160 can generate a new planned vehicle path that avoids the potential collision and cause the vehicle 102 to follow the new planned path, e.g., by autonomously controlling the steering of the vehicle, and avoid the potential collision.

When the user interface system 165 receives the trajectory prediction outputs 152, the user interface system 165 can use the trajectory prediction outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the trajectory prediction outputs 152 may contain a prediction that a particular surrounding agent is likely to cut in front of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To generate the trajectory prediction outputs 152, the trajectory prediction system 150 can use trained parameter values 195, i.e., trained model parameter values of the trajectory prediction system 150, obtained from a trajectory prediction model parameters store 190 in the training system 120.

The training system 120 is typically hosted within a data center 124, which can be a distributed computing system having hundreds or thousands of computers in one or more locations.

The training system 120 includes a training data store 170 that stores all the training data used to train the trajectory prediction system i.e., to determine the trained parameter values 195 of the trajectory prediction system 150. The training data store 170 receives raw training examples from, e.g., agents operating in the real world, from computer simulations of the real-world, or one or more computer programs that generate synthetic navigation scenarios by modifying real-world data.

For example, the training data store 170 can receive a raw training example 155 from the vehicle 102 and one or more other agents that are in communication with the training system 120. The raw training example 155 can be processed by the training system 120 to generate a new training example. The raw training example 155 can include scene data, i.e., like the scene data 142, that can be used as input for a new training example. The raw training example 155 can also include outcome data characterizing the state of the environment surrounding the vehicle 102 at the one or more future time points. This outcome data can be used to generate ground truth trajectories for one or more agents in the vicinity of the vehicle at the time point characterized by the scene data. Each ground truth trajectory identifies the actual trajectory (as derived from the outcome data) traversed by the corresponding agent at the future time points. For example, the ground truth trajectory can identify spatial locations in an agent-centric coordinate system to which the agent moved at each of multiple future time points.

The training data store 170 provides training examples 175 to a training engine 180, also hosted in the training system 120. The training engine 180 uses the training examples 175 to update model parameters that will be used by the trajectory prediction system 150, and provides the updated model parameters 185 to the trajectory prediction model parameters store 190. Once the parameter values of the trajectory prediction system 150 have been fully trained, the training system 120 can send the trained parameter values 195 to the trajectory prediction system 150, e.g., through a wired or wireless connection.

Training the trajectory prediction system 150 is described in more detail below.

Figure 2:
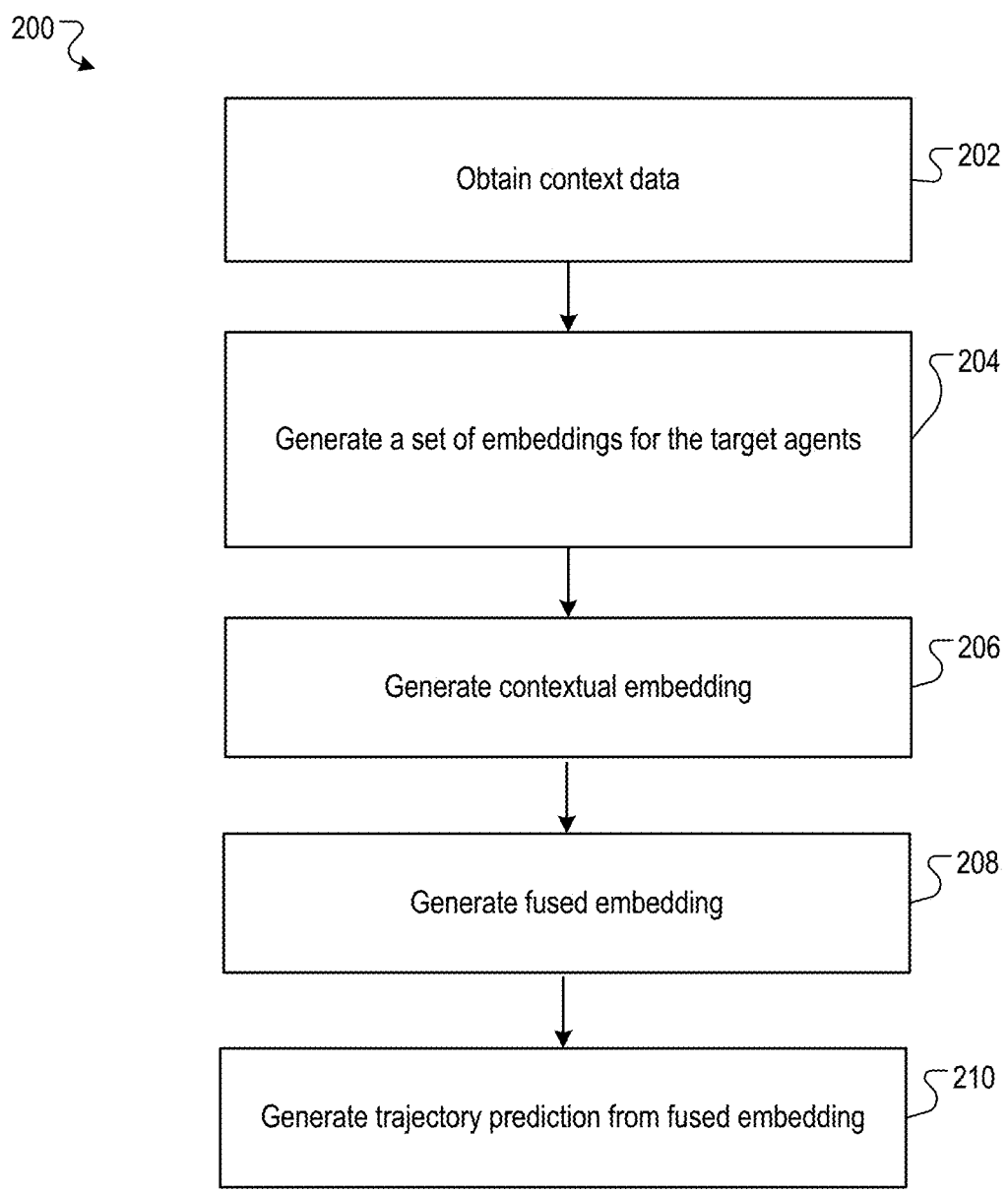
FIG. 2 is a flow diagram of an example process for generating a trajectory prediction output.

FIG. 2 is a flow diagram of an example process 200 for generating a trajectory prediction for an agent in the vicinity of the vehicle. For convenience, the process 200 will be described as being performed by a system of one or more computers located in one or more locations. For example, a trajectory prediction system, e.g., the trajectory prediction system 150 of FIG. 1, appropriately programmed in accordance with this specification, can perform the process 200.

In particular, the system performs the process 200 to generate a respective trajectory prediction for each of one or more target agents that are in the vicinity of the vehicle. An agent being in the vicinity of the vehicle refers to the agent being within range of the sensors of the vehicle.

The system obtains context data characterizing the environment (step 202). As described above, the context data includes data characterizing trajectories of each of a plurality of agents (including the target agent(s)) in the environment at a current time point and data characterizing a plurality of road features in the environment. Road features can include driving lanes, crosswalks, traffic lights, speed bumps, traffic signs, and so on.

The system then performs steps 204-210 for each of the target agent(s).

The system generates, from the context data, a set of embeddings (step 204). An embedding, as used in this specification, is an ordered collection of numerical values, e.g., a vector of numerical values, that has a predetermined dimensionality.

The set of embeddings includes a respective polyline embedding for each of a plurality of polylines that represent the road features. That is, for each particular road feature, the particular road feature is represented as a plurality of polylines that are derived from one or more parametric curves that define the particular road feature in a map of the environment. That is, each polyline is a line segment from a set of line segments that collectively approximate the geometry of the particular road feature. For example, a parametric curve defining a lane boundary can be approximated by sampling line segments that each connect two points on the parametric curve. As another example, a rectangular region defining a crosswalk can be approximated by sampling line segments along the boundaries of the rectangular region. As yet another example, a point on a map defining a road signal, e.g., a stop sign or a traffic signal, can be defined by a line segment that has the same start and end point, i.e., a point.

The set of embeddings also includes an agent state history embedding characterizing the trajectory of the target agent.

The set of embeddings also include an aggregated interaction embedding characterizing motion of other agents in the environment relative to the target agent.

Thus, as can be seen from the above, the set of embeddings represent different, heterogeneous aspects of the current state of the environment.

Generating these embeddings will be described below with reference to FIG. 3.

The system generates a contextual embedding for the target agent from the respective polyline embeddings and the agent state history embedding (step 206). The contextual embedding incorporates context from both static elements of the state of the environment, i.e., the road features, and dynamic elements of the state of the environment, i.e., the motion of the agents in the environment. Generating the contextual embedding is described below with reference to FIG. 3.

The system generates a fused embedding for the target agent from the contextual embedding, an embedding derived from the agent state history embedding, and the aggregated interaction embedding (step 208). For example, the system can combine, e.g., concatenate, sum, or average the contextual embedding, the embedding derived from the agent state history embedding, and the aggregated interaction embedding to generate the contextual embedding. The embedding derived from the agent state history embedding can be the agent state history embedding or a different embedding generated from processing the agent state history embedding. Generating the fused embedding is described in more detail below with reference to FIG. 3.

The system generates, from the fused embedding, a future trajectory prediction for the target agent that characterizes a predicted future trajectory of the target agent after the current time point (step 210). In particular, the system processes an input that includes the fused embedding using one or more prediction neural network heads to generate the future trajectory prediction for the target agent.

Figure 3:
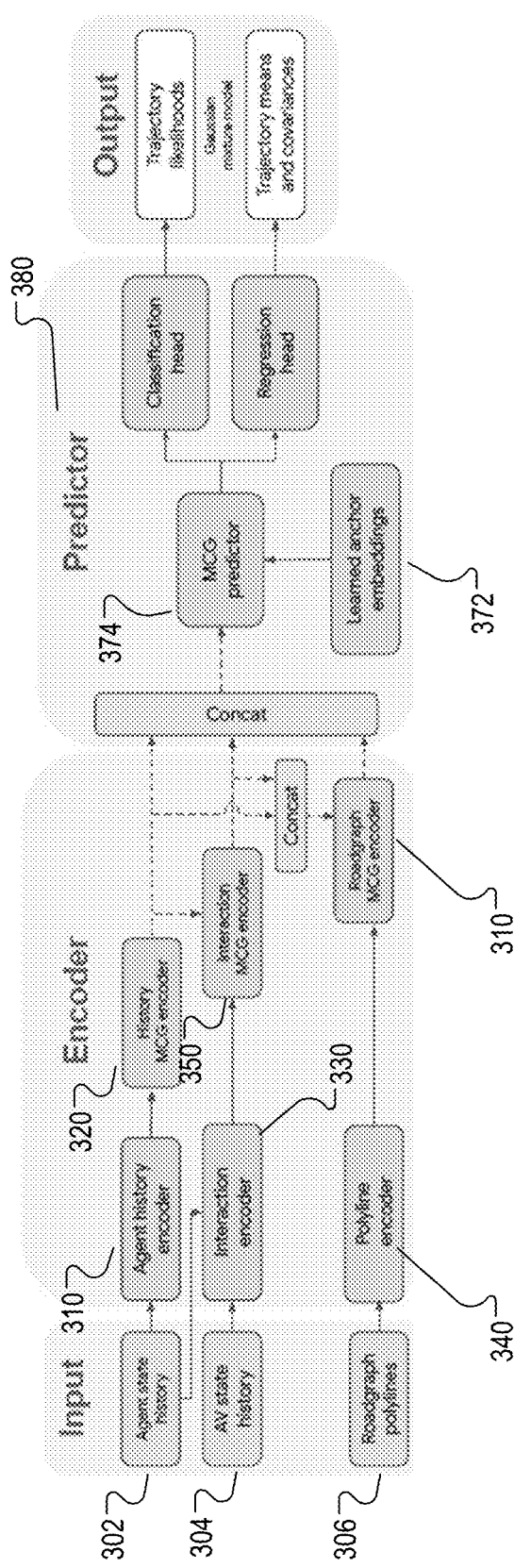
FIG. 3 shows the operation of the trajectory prediction system to generate a trajectory prediction output for a target agent.

FIG. 3 shows the operations performed by the trajectory prediction system 150 to generate a trajectory prediction output for a target agent.

As shown in FIG. 3, the system 150 receives agent state history 302 that characterizes the observed trajectories of agents in the environment.

The agent state history 302 includes, for the target agent and one or more other agents in the environment, a respective sequence of observations that each characterize a state of the agent at a different time point. Each observation can include, e.g., data characterizing the position and, optionally, one or more additional motion parameters, of the corresponding agent at the corresponding time point. For example, the agent state history 302 can include a respective sequence for the target agent and each of a set of neighboring agents, e.g., a threshold number of closest agents to the target agent at the current time or each other agent that is within a threshold distance of the target agent at the current time. In some cases, some of the agents may only have been observed, i.e., measured by the sensors of the vehicle 102, at only a subset of the time points, e.g., due to the agents becoming occluded or a sensor malfunction. In some implementations, to account for this, each observation in a given sequence can include data indicating whether the observation is a valid observation of the state of the corresponding agent at the corresponding time point or an invalid observation generated because the corresponding agent was not observed in the environment at the corresponding time point.

The system 150 also receives an AV state history 304 that characterizes the previous trajectory of the vehicle 102. The AV state history 304 includes a sequence of observations that each characterize a state of the vehicle 102 at a different time point.

From the agent state history 302 and the AV state history 304, the system 150 generates an agent state history embedding for the target agent and a respective interaction embedding for each neighbor agent and for the vehicle 102.

To generate the agent state history embedding, the system 150 processes one or more inputs derived from the respective sequence of observations for the target agent using an agent state history embedding neural network, i.e., an agent history encoder 310.

For example, the system 150 can generate an input sequence from the respective sequence by transforming the respective sequence into the reference frame of the target agent and then process the input sequence using a recurrent neural network within the agent history encoder 310, e.g., a long-short term memory (LSTM) neural network or a gated recurrent unit (GRU) neural network. In some cases, the agent state history embedding is a hidden state of the recurrent neural network after processing the last observation in the input sequence. In other cases, the system combines, e.g., concatenates, the hidden state with one or more other outputs to generate the embedding.

For example, the system can generate another output by generating another input sequence from the respective sequence that includes, for each time point after the first time point, a difference in the positions of the target agent between the time point and a preceding time point. The system can process this other input sequence using another recurrent neural network within the agent history encoder 310, e.g., a long-short term memory (LSTM) neural network or a gated recurrent unit (GRU) neural network, to generate, as the other output, the hidden state of the recurrent neural network after processing that last difference in the other input sequence.

As another example, the system can generate a set of historical elements for the target agent. Each element in the set includes a historical position and time offset in seconds relative to the present time of the time at which the agent occupied the historical position. The system can then process the historical elements using a stack of multi-context gating blocks, i.e., a history MCG encoder 320, with the context input being a learned or pre-determined representation of a default context input, e.g., an all-ones vector, to generate an updated set of historical elements. The system can then use a combination, e.g., an average or a concatenation, of these updated sets as another output.

A multi-context gating block receives a set of input elements and a context vector and generates as output an updated input element for each input in the set and an updated context vector. A stack of multi-context gating blocks is a sequence of multi-context gating blocks that collectively receive a set of input elements and a context vector and generate as output an updated input element for each input in the set and an updated context vector.

The operation of a multi-context gating block and a stack of multi-context gating blocks are described in more detail below with reference to FIG. 4.

To generate the interaction embedding for a given other agent, e.g., a neighbor agent or the vehicle 102, the system 150 transforms the respective sequence for the other agent into the reference frame of the target agent to generate a respective transformed sequence for the other agent and processes the respective transformed sequence for the other agent using an agent embedding neural network, i.e., an interaction encoder 330, to generate the interaction embedding for the other agent. For example, the interaction encoder 330 can be a recurrent neural network, e.g., an LSTM or a GRU, and the embedding for the other agent can be the hidden state of the recurrent neural network after processing the last observation in the transformed sequence.

Once the system 150 has generated the interaction embeddings for the other agents, the system 150 combines the interaction embeddings for the other agents to generate an aggregated interaction embedding for the target agent. The system 150 can combine the interaction embeddings in any of a variety of ways.

As one example, the system can combine the interaction embeddings by processing the set of interaction embeddings for the neighbor agents using a stack of multi-context gating blocks, i.e., an interaction MCG encoder 350, with the context input being a concatenation of the agent state history embedding for the target agent and the interaction embedding for the vehicle 102. The system can then combine, e.g., concatenate, the updated interaction embeddings generated as output by the multi-context gating stack to generate the aggregated interaction embedding for the target agent.

The system 150 also receives roadgraph polyline data 306 that represents a plurality of polylines that define the road features in the scene in the environment. That is, for each particular road feature, the particular road feature is represented as a plurality of polylines that are derived from one or more parametric curves that represent the particular road feature in a map of the environment. That is, each polyline is a line segment from a set of line segments that collectively approximate the geometry of the particular road feature. For example, for a given target agent, the roadgraph polyline data 306 can represent a threshold number of closest polylines to the agent at the current time point.

The system 150 uses the roadgraph polyline data 306 to generate a respective polyline embedding for each of the plurality of polylines.

To generate a polyline embedding for the embeddings that represent a particular road feature, the system 150 obtains, a respective feature for each polyline.

The system 150 then processes each of the feature vectors using a polyline embedding neural network, i.e., a polyline encoder 340, to generate a respective polyline embedding for each of the plurality of polylines derived from the one or more parametric curves that represent the particular road feature.

Each of the feature vectors characterizes (i) the spatial relationship of the polyline to the target agent and, optionally, (ii) identifies the road feature type of the particular road feature, e.g., identifies whether the particular road feature is a lane boundary, a crosswalk boundary, a speed bump, a road sign, a traffic signal, and so on. For example, each feature vector can include an encoding, e.g., a one-hot encoding, of the road feature type and a feature vector that includes features that represent the location of the polyline, e.g., the locations of the end points of the polyline, and the distance from one or more of the points along the polyline to the target agent.

The polyline encoder 340 can be any appropriate neural network that can map the features of the polyline to an embedding. For example, the polyline encoder 340 can be a multi-layer perceptron (MLP).

The system 150 then generates a contextual embedding that incorporates dynamic information about the state of the environment, e.g., as generated by the agent state history for the target agent, into the static information about the environment, e.g., as represented by the polyline embeddings.

In particular, the system 150 can process the polyline embeddings using a stack of multi-context gating blocks, i.e., the roadgraph MCG encoder 360, with the agent state history embedding as the context input, to generate a respective contextual polyline embedding for each of the polylines and then combine, e.g., concatenate or average, the contextual polyline embeddings to generate the contextual embedding.

The system 150 then generates a fused embedding for the target agent by combining, e.g., concatenating, the contextual embedding, the aggregated interaction embedding, and an embedding derived from the agent state history embedding. The embedding derived from the agent state history embedding can be the agent state history embedding or the updated agent state history embedding as generated by one of the above-described stacks of multi-context gating blocks that use the agent state history embedding as a context vector.

To generate the trajectory prediction for a given agent, the system processes the fused embedding for the target agent using a prediction neural network head 380.

The prediction neural network head 380 is a neural network that is configured to process the fused embedding to generate a trajectory prediction output that includes data characterizing a predicted similarity of the future trajectory of the agent to each of a plurality of anchor trajectories, i.e., to each of a fixed number of anchor trajectories. That is, the trajectory prediction output includes a probability for each anchor trajectory that represents the likelihood that the anchor trajectory is the most similar trajectory to the actual future trajectory for the agent.

Each anchor trajectory characterizes a possible future trajectory of the agent and includes data specifying a sequence of multiple waypoint spatial locations in the environment that each correspond to a possible position of the agent at a respective future time point. That is, each anchor trajectory defines a different possible future path through the environment that could be traversed by the agent after the current time point.

In some implementations, the anchor trajectories that are included in the fixed number are predetermined and represent a diverse set of possible behaviors that could be performed by an agent from any given current time. That is, the anchor trajectories are the same for all agents and are not dependent on the context data or any other information about the current scene in the environment. Because the anchor trajectories are also in the agent-centric coordinate system, the same set of anchor trajectories can be used for any agent no matter what the current position of the agent is in the current scene.

That is, in these implementations, the anchor trajectories are predetermined prior to the training of the trajectory prediction system.

As a particular example, the system can determine some or all of the anchor trajectories based on the training set of agent trajectories that will be used to train the trajectory prediction system. For example, the system can cluster the trajectories in the training set into the fixed number of clusters and then select a representative trajectory from each cluster as an anchor trajectory.

As another example, the system can determine some or all of the anchor trajectories in the fixed number of anchor trajectories by uniformly sampling trajectories from the space of possible trajectories.

In some implementations, the trajectory prediction output can also include, for each anchor trajectory, data characterizing, for each waypoint spatial location of the anchor trajectory, a probability distribution dependent on the waypoint spatial location. The probability distribution for a given waypoint spatial location defines respective likelihoods that the agent will occupy respective spatial positions in a vicinity of the waypoint spatial location at the future time point corresponding to the waypoint spatial location. That is, given that the agent follows the anchor trajectory, the probability distribution represents the space of predicted possible deviations from the anchor trajectory of the agent's actual future trajectory. In other words, for a given anchor trajectory, the probability distribution at a given future time point represents the space of possible deviations of the agent from the waypoint spatial location in the given anchor trajectory, with locations assigned higher probabilities being more likely deviations than locations assigned lower probabilities.

Thus, in these implementations, the trajectory prediction output includes K probabilities or other similarity scores, one for each of the K anchor trajectories. If each anchor trajectory includes T future time points, the trajectory prediction output also includes, for each of the K anchor trajectories and at each of the T future time points, data characterizing a probability distribution. Thus, if the data characterizing a probability distribution includes D values, then the trajectory prediction output for a given agent includes K+K×T×D values.

In particular, for any given waypoint spatial location, the data characterizing the probability distribution dependent on the waypoint spatial location includes data defining parameters of a parametric probability distribution dependent on the waypoint spatial location.

As a particular example, the parametric probability distribution dependent on the waypoint spatial location can be a Normal probability distribution and the data defining the parameters of the Normal probability distribution can include (i) an offset parameter specifying an offset of a mean of the Normal probability distribution from the waypoint spatial location, and (ii) covariance parameters of the Normal probability distribution. For example, the covariance parameters can define a 2×2 covariance matrix in the agent-centric coordinate system. In this example, the trajectory prediction output includes a respective similarity score for each anchor trajectory, and for each future time point in each anchor trajectory, the trajectory prediction output can include five values: the mean offset along the x dimension, the mean offset along the x dimension, the mean offset along they dimension, three parameters that define the covariance matrix. Thus, the trajectory prediction output would include the K similarity scores and K×T×5 values that define the probability distributions at the future time points within the K anchor trajectories.

As another particular example, the covariance can be fixed, and the data defining the parameters of the Normal distribution at a given future time point can only include the offset parameter for the given future time point.

In implementations where the anchor trajectories are fixed, the prediction neural network head 380 can have any appropriate architecture that maps the fused embedding to the trajectory prediction output, e.g., the head 380 can be an MLP or a recurrent neural network.

In some other implementations, the anchor trajectories are latent trajectories that are each represented by a latent embedding 372 that is learned during the training of the system 150. That is, there are no fixed anchor trajectories, and the system learns to generate the anchors dynamically for each target agent.

In these implementations, the head 380 receives as input the set of learned embeddings 372 for the latent anchors and the fused embedding and processes the input to generate the trajectory prediction output. For example, the head 380 can process the set of learned embedding using a stack of multi-context gating blocks 374 with the fused embedding as the context vector to generate a respective updated embedding for each anchor. The head 380 can then process the respective updated embeddings using an MLP to generate the trajectory prediction output.

In these implementations, the trajectory prediction output includes (i) a respective probability for each latent anchor trajectory that represents the likelihood that the anchor trajectory is the most similar trajectory to the actual future trajectory for the agent and (ii) data defining each latent anchor trajectory.

In particular, the trajectory prediction output also includes, for each latent anchor trajectory and for each future time point, data characterizing a probability distribution over waypoint spatial locations. The probability distribution for a given future time point defines respective likelihoods that the agent will occupy respective spatial positions at the future time point. That is, given that the agent follows the latent anchor trajectory, the probability distribution represents the space of predicted waypoint locations of the agent's actual future trajectory at the future time point.

Thus, in these implementations, the trajectory prediction output includes K probabilities or other similarity scores, one for each of the K latent anchor trajectories. If each anchor trajectory includes T future time points, the trajectory prediction output also includes, for each of the K latent anchor trajectories and at each of the T future time points, data characterizing a probability distribution. Thus, if the data characterizing a probability distribution includes D values, then the trajectory prediction output for a given agent includes K+K×T×D values.

In particular, for any given future time point within a given latent future trajectory, the data characterizing the probability distribution includes data defining parameters of a parametric probability distribution over waypoint spatial locations.

As a particular example, the parametric probability distribution dependent on the waypoint spatial location can be a Normal probability distribution and the data defining the parameters of the Normal probability distribution can include (i) a mean of the Normal probability distribution, and (ii) covariance parameters of the Normal probability distribution. For example, the covariance parameters can define a 2×2 covariance matrix in the agent-centric coordinate system. In this example, the trajectory prediction output includes a respective similarity score for each anchor trajectory, and for each future time point in each anchor trajectory, the trajectory prediction output can include five values: the mean along the x dimension, the mean along they dimension, and three parameters that define the covariance matrix. Thus, the trajectory prediction output would include the K similarity scores and K×T×5 values that define the probability distributions at the future time points within the K anchor trajectories.

As another particular example, the covariance can be fixed, and the data defining the parameters of the Normal distribution at a given future time point can only include the offset parameter for the given future time point.

In some implementations, the system employs an ensemble of multiple prediction heads. In these implementations, the system combines the trajectory prediction outputs generated by each prediction head in the ensemble to generate the final trajectory prediction output. For example, when training the system as described below with reference to FIG. 5, a training system can initialize the parameters (and, when latent trajectories are used, the latent embeddings for the latent trajectories) differently for each head in the ensemble, e.g., by initializing each head using different randomly-chosen parameter (and embedding) values.

When the anchor trajectories are fixed, the system can combine the trajectory prediction outputs by averaging the respective scores and distribution parameters for each of the anchors.

When the anchor trajectories are learned, each head in the ensemble can learn different latent embeddings and can therefore generate probability distributions with different modes. Also, when the anchor trajectories are learned, each head can have more latent anchor trajectories than should be represented in the final trajectory prediction output.

Thus, when the anchor trajectories are learned, the system can generate the final trajectory prediction output by applying an iterative clustering technique to the distribution parameters for the anchor trajectories for the various different latent anchors for the different heads to generate distribution parameters for a final set of latent anchor trajectories. For example, the system can perform the iterative clustering technique to maximize a probabilistic objective using the Expectation Maximization algorithm. The probabilistic objective can include, e.g., maximizing the probability that any centroid, i.e., any distribution mean waypoint location at any given time step, sampled from the distribution parameters for the anchor trajectories for the various different latent anchors for the different heads is within a threshold distance from one of the centroids in the distribution parameters for the final set of latent anchor trajectories while constraining the final set of latent anchor trajectories to only include a fixed number of trajectories.

Figure 4:
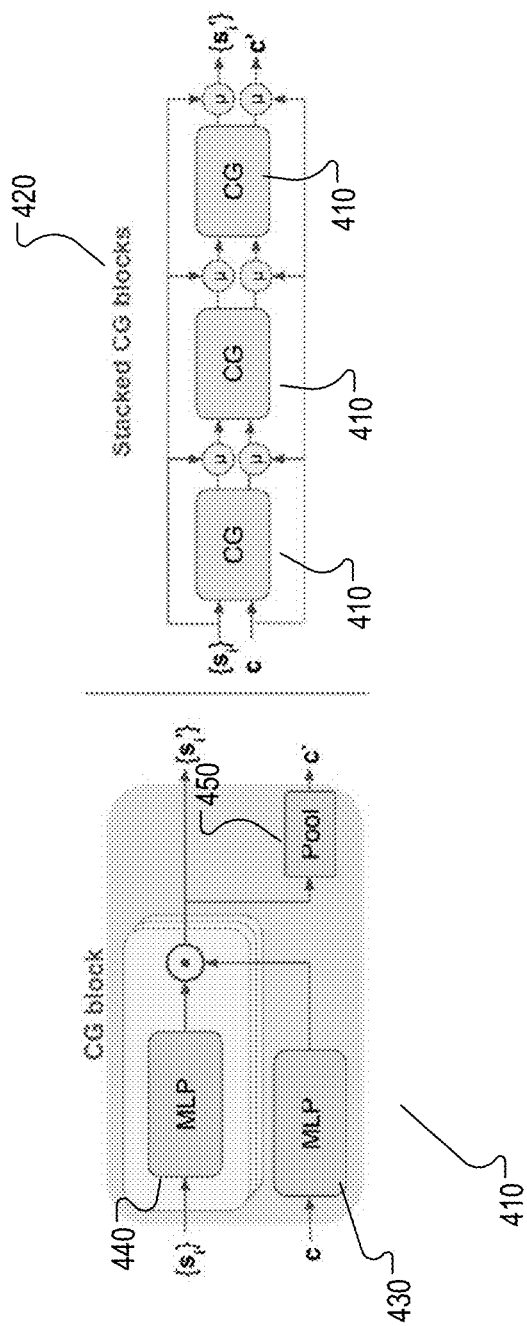
FIG. 4 shows the operation of a multi-context gating block and a stack of multi-context gating blocks.

FIG. 4 shows the operation of a multi-context gating block 410 and a stack 420 of multi-context gating blocks.

In particular, the multi-context gating block 410 receives as input a set of elements $s_i$, where i ranges from 1 to N and each element $s_i$ is a vector, and a context vector c and generates as output a respective updated element $s'_i$ for each element $s_i$ and an updated context vector c' for the context vector c.

To generate these updates, the block 410 processes the context vector using a first gating neural network 420 to generate a gating context vector. For example, the first gating neural network can be an MLP.

The block 410 also processes each element in the set using a second gating neural network 430 to generate a gating element corresponding to each element. For example, the first gating neural network can also be an MLP. In some implementations, the first and second gating neural network are the same, e.g., are the same MLP with different parameters. In some other implementations, the first and second gating neural networks are different, e.g., are both MLPs but with different parameter values.

For each element, the block 410 generates the updated element for the element from the gating element corresponding to the element and the gating context vector. For example, the block 410 can compute an element-wise product between the gating element corresponding to the element and the gating context vector.

After updating the elements, the block 410 updates the context vector from the updated elements. For example, the block 410 can combine the updated elements to generate a combined updated element and use the combined updated element as the updated context vector. In particular, the block 410 can apply a pooling operation 440, e.g., max pooling operation or an average pooling operation, to the updated elements to generate the updated context vector.

When there are multiple blocks 410, the blocks 410 are arranged in a stack 420, i.e., a sequence of blocks 410 where the first block 410 receives the input elements and the context vector that are provided as input to the stack of blocks 410 and each subsequent block 410 receives an input that is generated from the updated elements and the updated context vector generated as output by the preceding block. That is, when there are multiple blocks, the set of input elements and the context vector are updated at each of multiple iterations, i.e., with each block updating the set of input elements and the context vector at a respective iteration.

To generate the input elements and the context vector that are provided as input to a given block in the stack from the updated elements and the updated context vector generated as output by the preceding block, the system applies a skip connection to the updated elements and the updated context vector.

In some implementations, the skip connection is an additive skip connection. That is, for a given element, the output of the skip connection is the sum of (i) the output of the preceding block for the element and (i) the input to the preceding block for the element.

In some other implementations, the skip connection is a running average skip connection. That is, for a given element, the output of the skip connection is the average of (i) the input to the stack for the given element and (ii) the outputs for the given element for all preceding blocks in the stack.

Figure 5:
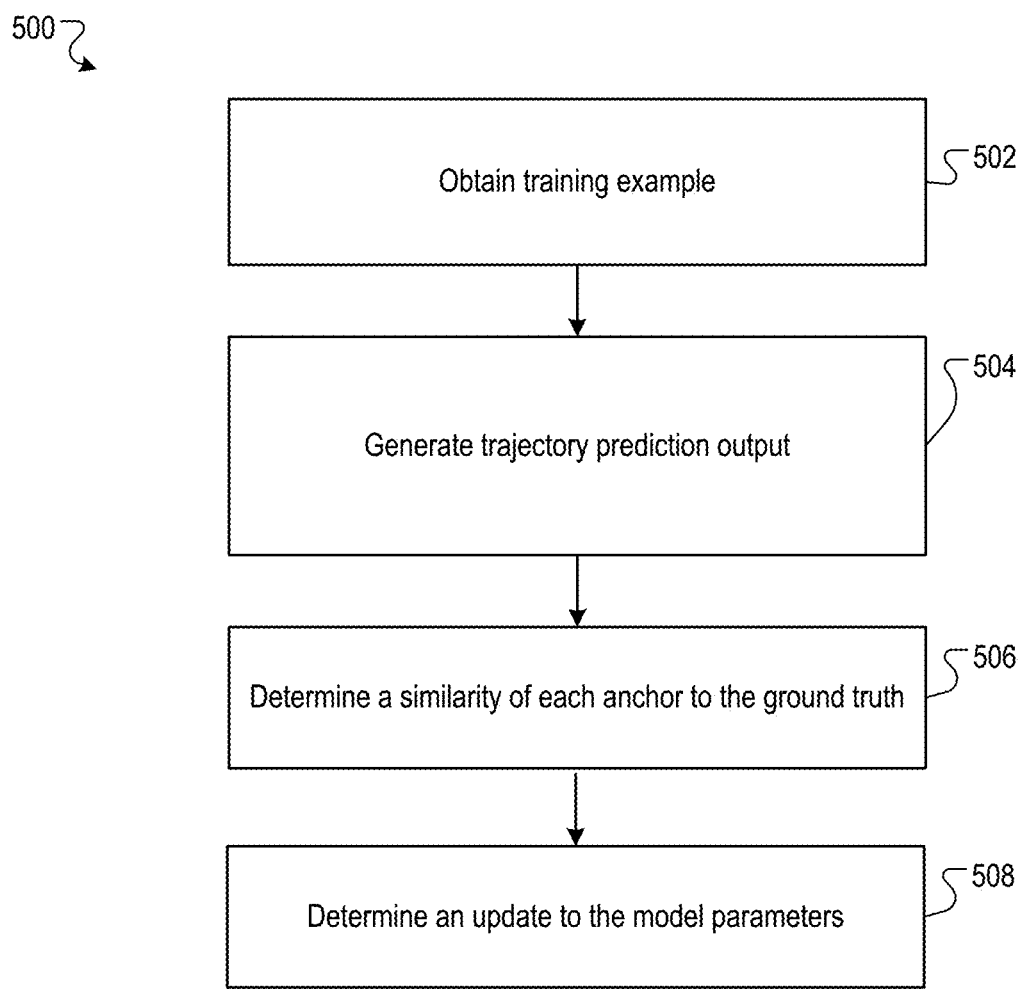
FIG. 5 is a flow diagram of an example process for training the trajectory prediction system.

FIG. 5 is a flow diagram of an example process 500 for training the trajectory prediction system. For convenience, the process 500 will be described as being performed by a system of one or more computers located in one or more locations. For example, a training system, e.g., the training system 120 of FIG. 1, appropriately programmed in accordance with this specification, can perform the process 500.

The system can perform the process 500 for each ground truth agent trajectory in a mini-batch of one or more ground truth agent trajectories sampled from a training set of ground truth agent trajectories to determine a respective model parameter update for each of the ground truth agent trajectory. The system can then combine, e.g., average or add, the respective model parameter updates to generate a combined update and then apply the combined update to the current values of the model parameters, e.g., in accordance with an optimizer being used for the training, e.g., the Adam optimizer, the rmsProp optimizer, or the stochastic gradient descent optimizer.

By repeatedly updating the model parameter values in this manner for different mini-batches of ground truth agent trajectories, the system can train the trajectory prediction system to generate accurate trajectory prediction outputs.

The system obtains a training example that includes scene data for an agent as of a first time point and a ground truth agent trajectory for the agent that identifies the actual trajectory followed by the agent after the first time point (step 502).

The system processes the context data using the trajectory prediction system as described above and in accordance with the current values of the model parameters, i.e., in accordance with current values of the parameters of the various neural network components, e.g., the multi-context gating blocks, the prediction heads, and the encoder neural networks, to generate a trajectory prediction output (step 504).

The system determines, for each of the anchor trajectories, a similarity of the anchor trajectory to the ground truth trajectory (step 506). For example, the system can compute the similarity between an anchor trajectory and a ground truth trajectory as the l2-norm distance or other appropriate distance measure in state-sequence space between the two trajectories, i.e., between the mean waypoints in each of the trajectories. As another example, the system can compute the similarity based on the probability assigned to the ground truth trajectory by the probability distribution for each of the latent trajectories.

The system determines an update to the current values of the model parameters by computing a gradient with respect to the model parameters of a loss function that is based on the similarities, the ground truth trajectory, and the trajectory prediction output (step 508). Because the system trains the components of the trajectory prediction neural network jointly, the system can backpropagate gradients of the loss function through the different components of the trajectory prediction neural network.

In some cases, the loss function employs a hard assignment between the ground truth trajectory and one of the anchor trajectories and therefore depends only on the anchor trajectory that is most similar to the ground truth trajectory. In these cases, the loss function can satisfy:

$$\Sigma_{k=1}^{K} 1(k=\hat{k}^m)[\log \pi(x^m;\theta) + \Sigma_{t=1}^{T} \log N(s_t^k|\mu_t^k, \Sigma_t^k; x^m; \theta)],$$

where K is the total number of anchor trajectories, $\theta$ are the model parameters, $1(k=\hat{k}^m)$ is an indicator function that is 1 when the index k is the same as the index $\hat{k}^m$ of the most similar anchor trajectory to the ground truth trajectory and 0 whenever the index k is not the same as the index $\hat{k}^m$, $\pi(x^m; \theta)$ is the probability assigned to anchor trajectory k in the trajectory prediction output given the scene data $x^m$, T is the total number of time points in the anchor trajectories, $N(s_t^k|\mu_t^k, s_t^k; x^m; \theta)$ is the probability assigned to waypoint spatial location $s_t^k$ at time t in the ground truth trajectory by a Normal distribution having a mean that is $\mu_t^k$ and covariance parameters $\Sigma_t^k$, where $a_t^k$ is the waypoint spatial location at time t in the anchor trajectory k, $\mu_t^k$ is the mean of the Normal probability distribution at time t in the trajectory prediction output for anchor trajectory k, and $\Sigma_t^k$ covariance parameters for the waypoint spatial location at time t in the trajectory prediction output for anchor trajectory k.

In some other cases, the loss function employs a soft assignment between the ground truth trajectory and the anchor trajectories and therefore depends on all of the anchor trajectories, with the contribution to the loss of any given anchor trajectory being dependent on the similarity between the given anchor trajectory and the ground truth trajectory. In these cases, the indicator term in the loss function above would be replaced with a term that assigns a weight to anchor trajectory k that depends on the similarity between the anchor trajectory k and the ground truth trajectory, e.g., equal to the similarity or a normalized similarity for anchor trajectory k.

Although the description above describes the trajectory predictions being made on-board a vehicle, as another example, the trajectory predictions may be made in a computer simulation of a real-world environment being navigated through by a simulated autonomous vehicle and the target agents. Generating these predictions in simulation may assist in controlling the simulated vehicle and in testing the realism of certain situations encountered in the simulation. More generally, generating these predictions in simulation can be part of testing the control software of a real-world autonomous vehicle before the software is deployed on-board the autonomous vehicle, of training one or more machine learning models that will later be deployed on-board the autonomous vehicle or both.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
   obtaining context data characterizing an environment, the context data comprising:
      data characterizing a plurality of road features in the environment;
   for each of one or more target agents of a plurality of agents in the environment:
      generating, from the context data, a respective polyline embedding for each of a plurality of polylines that represent the road features, the generating comprising:
         for each particular road feature:
            obtaining, for each of a plurality of polylines derived from one or more parametric curves that represent the particular road feature in a map of the environment, a respective feature vector that characterizes the polyline; and
            processing each of the respective feature vectors using a polyline embedding neural network to generate a respective polyline embedding for each of the plurality of polylines derived from the one or more parametric curves that represent the particular road feature;
      generating a contextual embedding for the target agent from at least the respective polyline embeddings; and
      generating, from the contextual embedding, a future trajectory prediction for the target agent that characterizes a predicted future trajectory of the target agent after the current time point; and
      controlling an autonomous vehicle to follow a planned path based on the future trajectory prediction for the agent.

2. The method of claim 1, wherein each of the respective feature vectors characterizes a spatial relationship of the target agent to the polyline.

3. The method of claim 1, wherein the context data further comprises data characterizing trajectories of each of the plurality of agents in the environment at a current time point, wherein the data characterizing the trajectories comprises, for each agent, a respective sequence of observations that each characterize a state of the agent at a different time point, and wherein generating the agent state history embedding comprises:
   processing an input sequence derived from the respective sequence of observations for the target agent using an agent state history embedding neural network to generate at least a portion of the agent state history embedding.

4. The method of claim 3, further comprising generating the input sequence derived from the respective sequence of observations for the target agent by transforming the respective sequence into a reference frame of the target agent.

5. The method of claim 3, wherein the agent state history embedding neural network is a recurrent neural network and wherein the portion of the agent state history embedding is a hidden state of the recurrent neural network after processing the last observation in the input sequence.

6. The method of claim 3, wherein the data characterizing the trajectories comprises, for each agent, a respective sequence of observations that each characterize a state of the agent at a different time point, and further comprising generating an aggregated interaction embedding characterizing motion of other agents in the environment relative to the target agent, the generating comprising:
   for each of one or more other agents in the environment:
      transforming the respective sequence for the other agent into a reference frame of the target agent to generate a respective transformed sequence for the other agent; and
      processing the respective transformed sequence for the other agent using an agent embedding neural network to generate an embedding for the other agent; and
   combining the embeddings for the other agents to generate the interaction embedding for the target agent.

7. The method of claim 6, wherein the other agent embedding neural network is a recurrent neural network and wherein the embedding for the other agent is a hidden state of the recurrent neural network after processing the last observation in the transformed sequence.

8. The method of claim 3, wherein each observation in the sequence includes data indicating whether the observation is a valid observation of the state of the corresponding agent at the corresponding time point or an invalid observation generated because the corresponding agent was not observed in the environment at the corresponding time point.

9. The method of claim 6, wherein generating the contextual embedding for the target agent from at least the respective polyline embeddings comprises:
   generating the contextual embedding for the target agent from the respective polyline embeddings and a agent state history embedding characterizing the trajectory of the target agent; and
   generating a fused embedding for the target agent from the contextual embedding, the agent state history embedding, and the interaction embedding, the generating comprising:
      concatenating the contextual embedding, an embedding derived from the agent state history embedding, and the interaction embedding.

10. The method of claim 6, wherein generating the contextual embedding comprises:
    initializing a context vector from the agent state history embedding; and
    updating the context vector and the polyline embeddings at each of a plurality of iterations.

11. The method of claim 10, wherein the updating comprises:
    at each iteration:
        processing the context vector using a first gating neural network to generate a gating context embedding;
        for each polyline,
            processing the polyline embedding for the polyline using a second gating neural network to generate a gating vector, and updating the polyline embedding from the gating vector for the polyline and the gating context embedding; and after updating the polyline embeddings, updating the context vector from the polyline embeddings.

12. The method of claim 11, wherein the first gating neural network is the same as the second gating neural network.

13. The method of claim 11, wherein updating the context vector from the polyline embeddings comprises:
combining the polyline embeddings to generate a combined polyline embedding.

14. The method of claim 1, wherein the future trajectory prediction defines a probability distribution over possible future trajectories for the target agent.

15. The method of claim 14, wherein the future trajectory prediction comprises a respective trajectory prediction for each of a plurality of anchor trajectories that comprises a probability that the anchor trajectory is the closest anchor trajectory to the future trajectory of the agent.

16. The method of claim 15, wherein the trajectory prediction for each of the anchor trajectories comprises a deviation output that defines deviations from the anchor trajectory given that the anchor trajectory is the closest anchor trajectory to the future trajectory of the agent.

17. The method of claim 1, wherein generating the future trajectory prediction output comprises:
for each of a plurality of prediction heads, processing the fused embedding using the prediction head to generate a respective initial trajectory prediction for each of a plurality of anchor trajectories; and
generating the future trajectory prediction output by combining the initial trajectory predictions generated by the plurality of prediction heads.

18. The method of claim 1, wherein
each of the plurality of agents is an agent in a vicinity of an autonomous vehicle in an environment, and
the context data comprises data generated from data captured by one or more sensors of the autonomous vehicle.

19. The method of claim 1, further comprising:
providing (i) the trajectory predictions for the one or more target agents, (ii) data derived from the trajectory predictions for the one or more target agents, or (iii) both to an on-board system of the autonomous vehicle for use in controlling the autonomous vehicle.

20. The method of claim 1, wherein:
each of the plurality of agents is a simulated agent in a vicinity of a simulated autonomous vehicle in a computer simulation of a real-world environment, and
the context data comprises data generated from data that simulates data that would be captured by one or more sensors of an autonomous vehicle in the real-world environment.

21. A system comprising:
one or more computers; and
one or more storage devices storing instructions that, when executed by the one or more computers, cause the one or more computers to perform operations comprising:
obtaining context data characterizing an environment, the context data comprising:
data characterizing a plurality of road features in the environment;
for each of one or more target agents of a plurality of agents in the environment:
generating, from the context data, a respective polyline embedding for each of a plurality of polylines that represent the road features, the generating comprising:
for each particular road feature:
obtaining, for each of a plurality of polylines derived from one or more parametric curves that represent the particular road feature in a map of the environment, a respective feature vector that characterizes the polyline; and
processing each of the respective feature vectors using a polyline embedding neural network to generate a respective polyline embedding for each of the plurality of polylines derived from the one or more parametric curves that represent the particular road feature;
generating a contextual embedding for the target agent from the respective polyline embeddings; and
generating, from the contextual embedding, a future trajectory prediction for the target agent that characterizes a predicted future trajectory of the target agent after the current time point; and
controlling an autonomous vehicle to follow a planned path based on the future trajectory prediction for the agent.

22. One or more non-transitory computer-readable storage media storing instructions that when executed by one or more computers cause the one or more computers to perform operations comprising:
obtaining context data characterizing an environment, the context data comprising:
data characterizing a plurality of road features in the environment;
for each of one or more target agents of a plurality of agents in the environment:
generating, from the context data, a respective polyline embedding for each of a plurality of polylines that represent the road features, the generating comprising:
for each particular road feature:
obtaining, for each of a plurality of polylines derived from one or more parametric curves that represent the particular road feature in a map of the environment, a respective feature vector that characterizes the polyline; and
processing each of the respective feature vectors using a polyline embedding neural network to generate a respective polyline embedding for each of the plurality of polylines derived from the one or more parametric curves that represent the particular road feature;
generating a contextual embedding for the target agent from at least the respective polyline embeddings; and
generating, from the contextual embedding, a future trajectory prediction for the target agent that characterizes a predicted future trajectory of the target agent after the current time point; and
controlling an autonomous vehicle to follow a planned path based on the future trajectory prediction for the agent.

* * * * *